United States Patent
Nolte et al.

(10) Patent No.: US 8,281,249 B2
(45) Date of Patent: Oct. 2, 2012

(54) APPARATUS AND METHOD FOR VISUALLY DISPLAYING AN ITEM OF STATUS INFORMATION RELATING TO A TECHNICAL PROCESS ON A PLURALITY OF SCREENS

(75) Inventors: Raimund Nolte, Finnentrop (DE); Sven Syassen, Herzogenaurach (DE)

(73) Assignee: Siemens Aktiengesellschaft, München (DE)

( * ) Notice: Subject to any disclaimer, the term of this patent is extended or adjusted under 35 U.S.C. 154(b) by 482 days.

(21) Appl. No.: 12/527,203

(22) PCT Filed: Feb. 14, 2008

(86) PCT No.: PCT/EP2008/051817
§ 371 (c)(1),
(2), (4) Date: Jan. 29, 2010

(87) PCT Pub. No.: WO2008/098997
PCT Pub. Date: Aug. 21, 2008

(65) Prior Publication Data
US 2010/0131888 A1      May 27, 2010

(30) Foreign Application Priority Data
Feb. 15, 2007   (DE) .................. 10 2007 007 538

(51) Int. Cl.
*G06F 3/00* (2006.01)
(52) U.S. Cl. ........ 715/761; 715/771; 715/781; 715/788; 345/1.1; 345/1.2; 345/1.3
(58) Field of Classification Search .................. 715/761, 715/771, 781, 788, 799, 800; 345/1.1, 1.2, 345/1.3
See application file for complete search history.

(56) References Cited

U.S. PATENT DOCUMENTS

| | | | | |
|---|---|---|---|---|
| 5,412,400 A | * | 5/1995 | Takahara et al. | 715/788 |
| 5,631,825 A | | 5/1997 | Van Weele et al. | |
| 5,694,150 A | * | 12/1997 | Sigona et al. | 715/856 |
| 5,835,090 A | * | 11/1998 | Clark et al. | 715/764 |
| 5,923,307 A | * | 7/1999 | Hogle, IV | 345/4 |
| 6,084,553 A | * | 7/2000 | Walls et al. | 715/781 |
| 6,621,500 B1 | * | 9/2003 | Alcorn et al. | 345/629 |
| 6,717,556 B2 | * | 4/2004 | Asahi et al. | 345/1.1 |
| 7,176,943 B2 | * | 2/2007 | Meyers et al. | 345/619 |
| 7,525,511 B2 | * | 4/2009 | Baudisch | 345/1.3 |
| 7,739,604 B1 | * | 6/2010 | Lyons et al. | 715/736 |

(Continued)

FOREIGN PATENT DOCUMENTS

DE    112005001032    6/2007

(Continued)

*Primary Examiner* — Weilun Lo
*Assistant Examiner* — Rashedul Hassan

(57) ABSTRACT

An apparatus for visually displaying an item of status information relating to a technical process is provided, the item being obtained using a process visualization system. The apparatus includes image generating means for generating an image with two image sections, wherein a display window associated with the process visualization system is displayed in the image. An information region for displaying the status information is provided in the display window. The display window is continuously configured by a user. The apparatus has image control means configured to detect a configuration of the display window carried out by the user, to determine image section regions of the display window which have been placed into individual image sections, to compare the image section regions which have been determined with a predefined selection criterion, and to automatically arrange an information region in each image section region of the display window satisfying the selection criterion.

15 Claims, 2 Drawing Sheets

U.S. PATENT DOCUMENTS

| | | | |
|---|---|---|---|
| 2002/0075198 A1* | 6/2002 | Asahi et al. | 345/1.1 |
| 2003/0142037 A1 | 7/2003 | Pinedo et al. | |
| 2003/0227423 A1* | 12/2003 | Arai et al. | 345/1.1 |
| 2004/0263424 A1* | 12/2004 | Okuley | 345/1.1 |
| 2004/0263426 A1* | 12/2004 | Endo | 345/2.2 |
| 2005/0022135 A1* | 1/2005 | de Waal | 715/788 |
| 2006/0001593 A1* | 1/2006 | Baudisch | 345/1.1 |

FOREIGN PATENT DOCUMENTS

WO    WO 2004036410 A1    4/2004

* cited by examiner

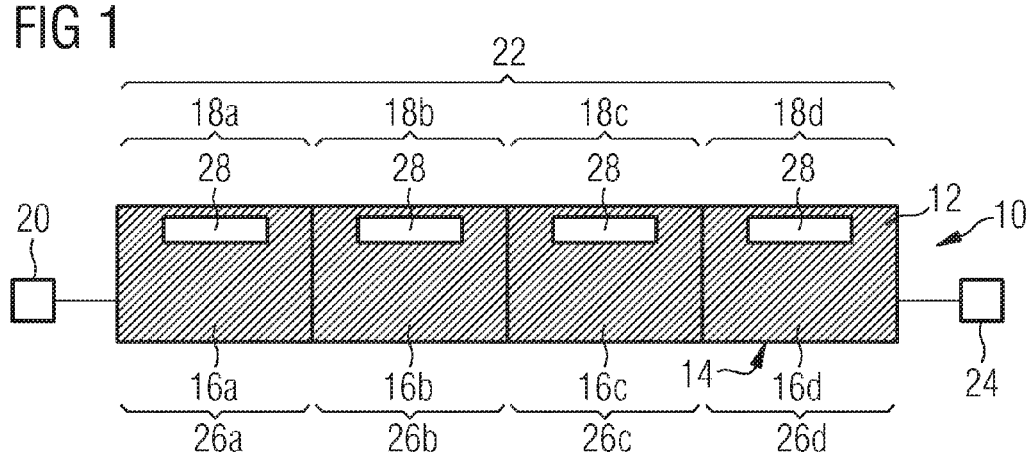
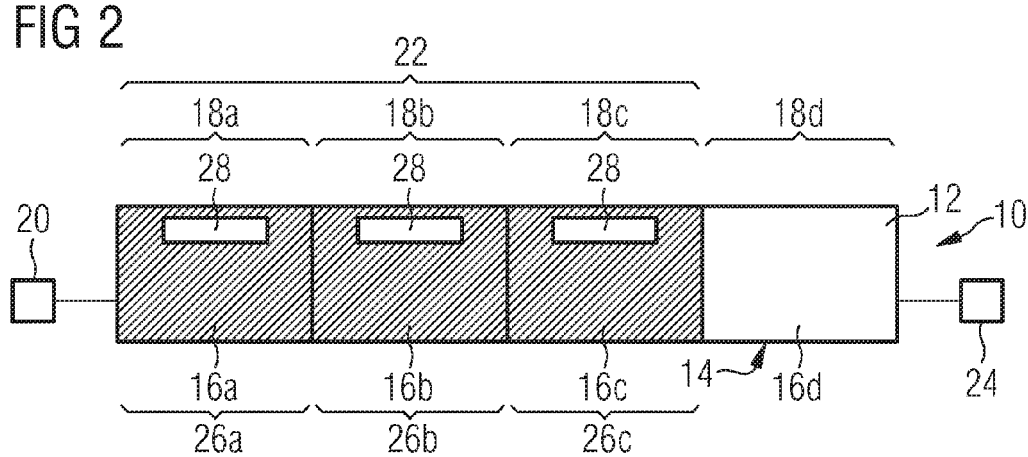
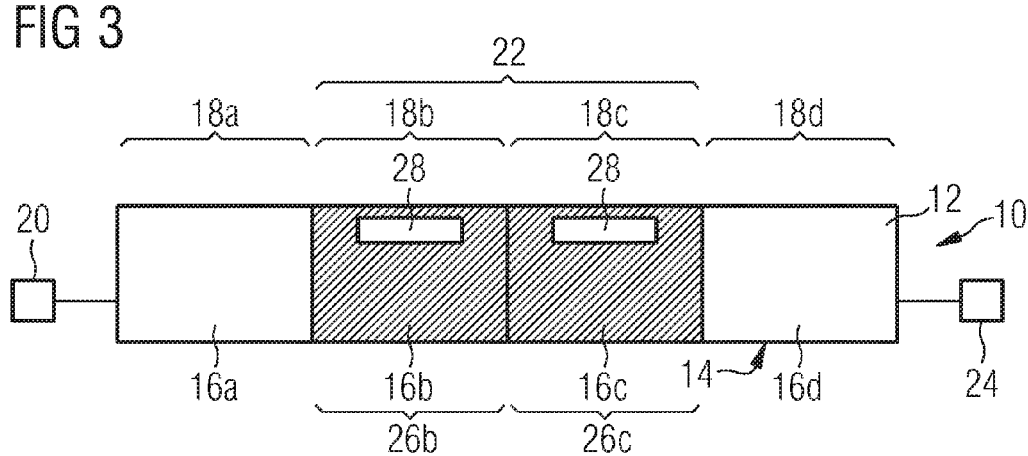

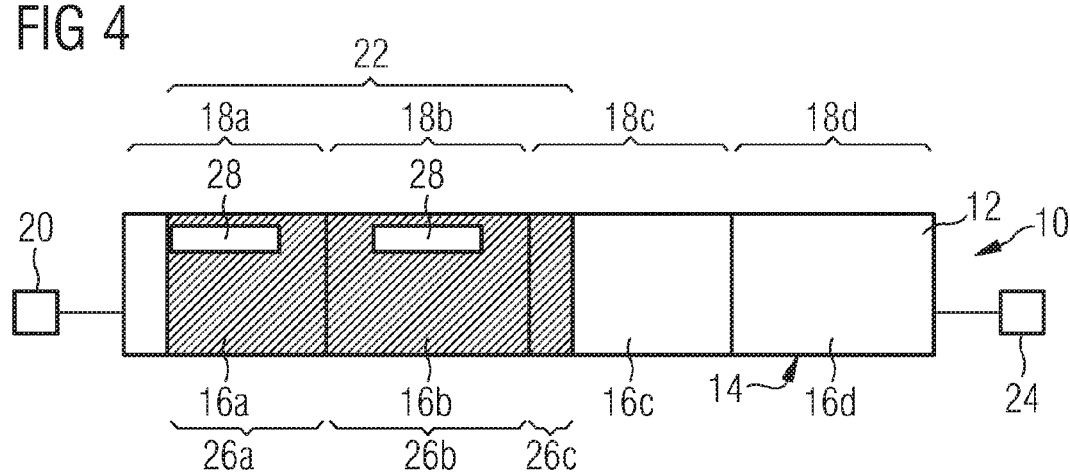
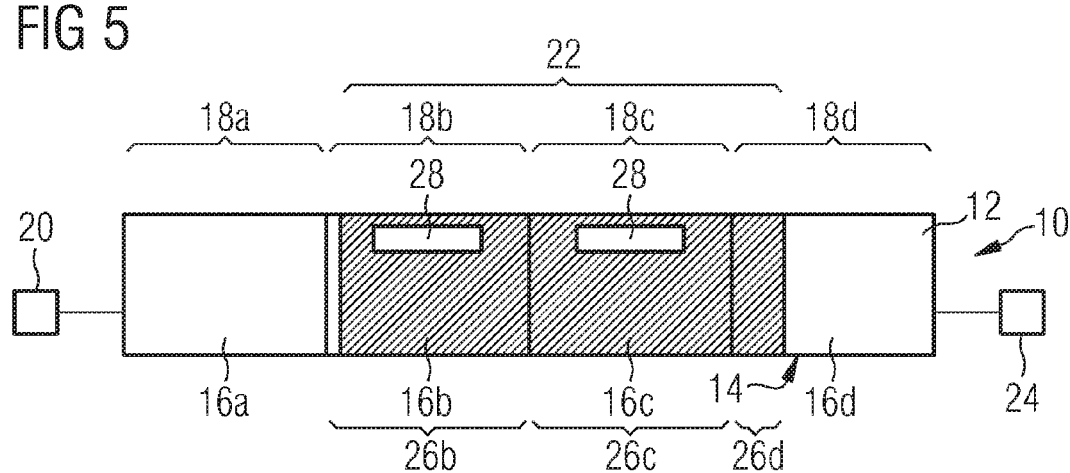

APPARATUS AND METHOD FOR VISUALLY DISPLAYING AN ITEM OF STATUS INFORMATION RELATING TO A TECHNICAL PROCESS ON A PLURALITY OF SCREENS

CROSS REFERENCE TO RELATED APPLICATIONS

This application is the US National Stage of International Application No. PCT/EP2008/051817 filed Feb. 14, 2008 and claims the benefit thereof. The International Application claims the benefits of German Patent Application No. 10 2007 007 538.5 DE filed Feb. 15, 2007; both of the applications are incorporated by reference herein in their entirety.

FIELD OF INVENTION

The invention relates to an apparatus for visually displaying at least one item of status information which relates to a technical process and has been obtained using a process visualization system. The apparatus comprises image generating means for generating an image with at least two image sections, wherein a display window which is associated with the process visualization system can be displayed in the image, and at least one information region for displaying the status information is provided in the display window. The invention also relates to a method for visually displaying at least one item of status information which relates to a technical process and has been obtained using a process visualization system. The method includes the step of providing image generating means to generate an image with at least two image sections, wherein a display window which is associated with the process visualization system can be displayed in the image, and at least one information region for displaying the status information is provided in the display window.

BACKGROUND OF INVENTION

Process visualization systems (SCADA systems—supervisory control and data acquisition systems) are used to display status information which relates to technical processes and plant statuses in a user-friendly fashion. The status information may include switch settings or operating information relating to a basic technical plant and is obtained by means of measuring devices. In order to display at least one item of status information, which in the case of complex systems is generally a significantly compressed item of information, generally an item of status information calculated from a plurality of individual information, the apparatus cited in the introduction is used. To display the individual image sections, several screens are frequently used (multiscreen environment). For ergonomic reasons, the status information is to be displayed here on as many screens as possible, ideally on each screen. In the case of workstations of this type, screens or parts of the overall image surface are also frequently used at times to display information which does not originate from the process visualization system. The information originating from the process visualization system on the other hand is displayed in a display window which is associated with the process visualization system.

To ensure that the at least one item of status information obtained by means of the process visualization system is displayed on as many screens as possible, in the case of visualization apparatuses from the prior art, a very restricted number of configurations of the display window and thus display scenarios are predetermined. During operation of the plant, the user is only able to manually select one of these preconfigured display types. The user is therefore very restricted in respect of the use of the image surface for applications which are independent of the process visualization system.

SUMMARY OF INVENTION

It is one object of the invention to solve the afore-cited problems and in particular to improve an apparatus and/or a method of the type cited in the introduction such that the user obtains increased flexibility when using the image surface, but is at the same time suitably informed about the status of the technical process which is monitored by means of the process visualization system.

The object is achieved in accordance with the invention with an apparatus and a method as claimed in the independent claims. Advantageous developments of the invention are described in the dependent claims.

According to the invention, a generic apparatus is provided, in which the display window can be continuously configured by a user within the image and the apparatus is set up to detect the configuration of the display window performed by the user, to determine image section regions of the display window placed into the respective individual image sections, to compare the determined image section regions with a predetermined selection criterion and to automatically assign an information region in each image section region of the display window which fulfills the selection criterion.

Provision is also made in accordance with the invention for a generic method to be provided, which is characterized by the following steps: continuously configuring the display window within the image by means of a user, automatically detecting the configuration of the display window performed by the user, determining respective image section regions of the display window placed in the individual image sections, and comparing the specific image section regions with a predetermined selection criterion and automatically arranging an information region in each image section region of the display window which fulfils the selection criterion.

According to the invention, the display window assigned to the process visualization system can be continuously configured within the image. The shape, size and/or position of the display window can therefore be freely selected by the user. In other words, the display window can be spanned arbitrarily by the user across several image sections, and thus for instance across several screens of the workstation. The shape, size and/or position of the display window are monitored dynamically by the apparatus. Image section regions of the display window which are positioned respectively in the individual image sections are consequently determined by the apparatus. This occurs by the size and position of the display window being compared with the information relating to the existing image sections and/or screens which is supplied by the operating system.

The image section region may be part of a subsection of the display window if the display window extends across several image sections. In the event that the display window is only arranged in one image section, the image section region assigned to this image section corresponds with the display window.

Comparing the specific image section regions with a predetermined selection criterion determines the image section regions of the display window in which an information region can be expediently arranged. The selection criterion may define a minimum size for the image section regions for instance, in which an information region is arranged. Finally, according to the invention the apparatus automatically arranges an information region to display the status information in each image section region of the display window which fulfills the selection criterion.

The inventive possibility of continuously configuring the display window within the overall image provides the user with increased flexibility in terms of using the whole image surface. The user can therefore free an image surface attuned to his/her individual requirements for a use which is independent of the process visualization system. At the same time, the user is however also ergonomically informed of the status of the technical process by means of the inventive automatic arrangement of the information region in all suitable image section regions of the display window. A manual preconfiguration of different display scenarios is thus no longer necessary in accordance with the invention. This results in reduced engineering costs and at the same time in the flexible use of the workstation.

In a preferred embodiment, the predefined selection criterion defines a minimum size of the image section region in at least one image dimension, in particular in a horizontal image dimension. The selection criterion preferably defines the minimum size such that the status information can still be displayed in an easily readable fashion for the user in the remaining image section region.

It is also advantageous for the image generating means to include at least two screens, one of which generates an image section in each instance. In this case, the overall image is generated by means of several screens, which are preferably arranged adjacent to one another. The overall image does not necessarily have to be shown contiguously. The screens can also be arranged at a certain distance from one another.

It is also advantageous for the apparatus to be set up to adjust the position and/or size of the information region to the shape and/or size of the corresponding image section region in the case of the respective arrangement of an information region in a suitable image section region. In the event that an image section region in a certain image section does not reach a typical size of the information region, the information region can be reduced correspondingly provided the readability of the displayed status information is also ensured as a result.

It is also expedient for the display window to be configurable within the image such that the display window extends across at least two image sections. The display window thus offers sufficient space to display complex information which relates to the technical process and was obtained by means of the process visualization system. It is also advantageous if an information region is arranged in each of the at least two image sections in order to ergonomically display to the user the important status information relating to the technical process. This also ensures that the status information is arranged in the field of view of the user and the user is therefore able to promptly identify a change in the status information which renders necessary an active intervention on the part of the user.

It is also advantageous for the apparatus to be set up so as to arrange at least one information region in a non-coverable region of the display window. This therefore ensures that the status information remains visible to the user in each situation. This measure ensures that statuses which relate to the technical process and which render intervention from the user necessary, make this transparent to the user at any time by way of the status information.

The features cited in respect of the advantageous embodiment of the inventive apparatus which is cited above can be transferred accordingly to the inventive method. The advantageous embodiments of the inventive method resulting therefrom are to be explicitly included in the disclosure of the invention. The previously cited advantages relating to the advantageous embodiments of the inventive apparatus also therefore relate to the corresponding advantageous embodiments of the method according to the invention.

BRIEF DESCRIPTION OF THE DRAWINGS

An exemplary embodiment of an inventive apparatus as well as a method for visually displaying an item of status information which relates to a technical process and was obtained by means of a process visualization system is explained in more detail below on the basis of the appended schematic drawings, in which:

FIG. 1 shows a schematic representation of an exemplary embodiment of an apparatus according to the invention in a first operating state, FIG. 2 shows the apparatus according to FIG. 1 in a second operating state, FIG. 3 shows the apparatus according to FIG. 1 in a third operating state, FIG. 4 shows the apparatus according to FIG. 1 in a fourth operating state, and FIG. 5 shows the apparatus according to FIG. 1 in a fifth operating state.

DETAILED DESCRIPTION OF INVENTION

FIGS. 1 to 5 show an inventive exemplary embodiment of an apparatus 10 for visually displaying at least one item of status information which relates to a technical process and has been obtained by means of a process visualization system in different operating states. A process visualization system of this type is also referred to as a SCADA system (supervisory control and data acquisition).

The status information which relates to the technical process and has been obtained by means of the process visualization system is advantageously a highly-condensed item of process information, for instance an item of status information generated from a plurality of information items, by means of which faulty developments in a monitored technical process can be quickly identified. The apparatus 10 includes image generating means 12 for generating an image 14. The image generating means 12 include in the present case several consecutively arranged screens 16a, 16b, 16c, 16d. Each of the screens 16a, 16b, 16c and 16d generates a respective image section 18a, 18bm 18c, and/or 18d. All image sections 18a, 18b 18c and 18d together form the image 14.

The apparatus 10 also comprises control means 20 for configuring a display window 22 within the image 14 by means of the user. The display window 22 can be configured such that it extends across several screens 16a, 16b, 16c and/or 16d and/or image sections 18a, 18b, 18c and/or 18d. In the operating state of the apparatus shown in FIG. 1, the display window 22 extends across all four image sections 18a, 18b, 18c and 18d, in the operating state according to FIG. 2 only across the image sections 18a, 18b and 18c and in the operating state according to FIG. 3 only across the image sections 18b and 18c. In the operating state according to FIG. 4, the display window 22 only partially extends across the image section 18a and 18c and completely extends across the image section 18b. In the operating state according to FIG. 5, the display window 22 extends almost completely across the image section 18b, completely across image section 18b and marginally across image section 18d.

In the FIGS., an exemplary illustration therefore shows that the display window 22 can be configured within the image 14 and thus in a continuously flexible fashion across all screens 16a, 16b, 16c and 16d and is therefore freely definable in respect of size and/or position. The display window 22 can therefore be arbitrarily spanned by the operator across several screens 16a, 16b, 16c and/or 16d.

The apparatus 10 also includes image control means 24 which are set up to detect the configuration of the display window 22 performed by the user and to determine respective image section regions 26a, 26b, 26c and/or 26d of the display window 22 which are placed into the individual image sections 18a, 18b, 18c and 18d. The image section regions 26a, 26b, 26c and/or 26d are defined as those regions of the display window 14 which lie in a respective image section 18a, 18b, 18c and/or 18d. In the operating state according to FIG. 1, the image section regions 26a, 23b, 26c and 26d each correspond to the image sections 18a, 18b, 18c and 18d, in the operating state according to FIG. 2 the image section regions 26a, 26b and 26c correspond respectively to the image sections 18a, 18b and 18c and in the operating state according to FIG. 3 the image section regions 26a and 26c correspond respectively to the image sections 18b and 18c. In FIG. 4, the image section regions 26a and 26c only occupy one part of the respective image sections 18a and 18c. The same applies to the image section regions 26b and 26d according to FIG. 5.

The image control means 24 also compare the specific image section regions 26a, 26b, 26c and/or 26d with a predetermined selection criterion, for instance in the form of a minimum size of the respective image section region in the horizontal direction. This minimum size is selected for instance such that the status information in the corresponding information region 28 can be displayed in a readable form in the corresponding information region 28. The image control means 24 then arrange an information region 28 of this type at a suitable position in each of the image section regions 26a, 26b, 26c and/or 26d which fulfill the selection criterion. The image control means 24 therefore define both the number as well as the position of the information regions 28 in the display window 22.

In the operating states according to FIGS. 1 to 3, an information region 28 is arranged in each of the image section regions. In the operating state according to FIG. 4, the image section region 26c does not fulfill the selection criterion in respect of its horizontal extension, for which reason no information region 28 is arranged here. The same applies to the image section region 26d according to FIG. 5. In the image section region 26a according to FIG. 4, the horizontal extension is sufficient to display an information region 28. This is arranged centrally in the image section region 26a in respect of its position. The same applies to the image section region 26b according to FIG. 5.

The invention claimed is:

1. An apparatus for visually displaying status information relating to a technical process, the status information being obtained using a process visualization system, comprising:
 at least two screens for generating an image with at least two image sections;
 a display window being displayed in the image, the display window being associated with the process visualization system;
 an information section for displaying the status information, the information section being provided within the display window; and
 an image control device,
 wherein the display window is configured continuously within the image by a user, and
 wherein the image control device is configured
  to detect a configuration of the display window,
  to determine image section regions of the display window placed into the image sections,
  to compare the determined image section regions with a predetermined selection criterion, and
  to automatically arrange one information section in each image section region of the display window which fulfill the selection criterion.

2. The apparatus as claimed in claim 1, wherein the predetermined selection criterion defines a minimum size of the image section regions in at least one image dimension.

3. The apparatus as claimed in claim 2, wherein the at least one image dimension is a horizontal image dimension.

4. The apparatus as claimed in claim 1, wherein each of the at least two screens generates an image section.

5. The apparatus as claimed in claim 2, wherein each of the at least two screens generates an image section.

6. The apparatus as claimed in claim 1, wherein the apparatus is configured to adjust the position or size of the information section to the shape or size of the corresponding image section region when arranging the information section in the image section region.

7. The apparatus as claimed in claim 1, wherein the display window extends across at least two image sections.

8. The apparatus as claimed in claim 1, wherein the apparatus is configured to arrange the information section in a non-coverable region of the display window.

9. A method of visually displaying status information relating to a technical process, the status information being obtained by a process visualization system, comprising:
 providing at least two screens for generating an image with at least two image sections,
 providing a display window assigned to the process visualization system, the display window being displayed in the image;
 providing an information section for displaying the status information, the information section being provided in the display window;
 configuring continuously the display window within the image by a user;
 detecting automatically a configuration of the display window;
 determining image section regions of the display window positioned in the image sections;
 comparing the determined image section regions with a predetermined selection criterion; and
 arranging automatically one information section in each image section region of the display window satisfying the selection criterion.

10. The method as claimed in claim 9, wherein the predetermined selection criterion defines a minimum size of the image section regions in at least one image dimension.

11. The method as claimed in claim 10, wherein the at least one image dimension is a horizontal image dimension.

12. The method as claimed in claim 9, wherein each of the at least two screens generates an image section.

13. The method as claimed in claim 9, further comprising: adjusting the position or size of the information section to the shape or size of the corresponding image section region when arranging the information section in the image section region.

14. The method as claimed in claim 9, wherein the display window extends across at least two image sections.

15. The method as claimed in claim 9, wherein the information section is arranged in a non-coverable region of the display window.

* * * * *